Feb. 25, 1941.                G. E. ARMINGTON                2,233,192
                            TRACTOR BRAKING CONTROL
                        Filed Nov. 13, 1937          2 Sheets-Sheet 1

INVENTOR
GEORGE E. ARMINGTON
BY
Brockett, Hyde, Higley & Mayer
ATTORNEYS

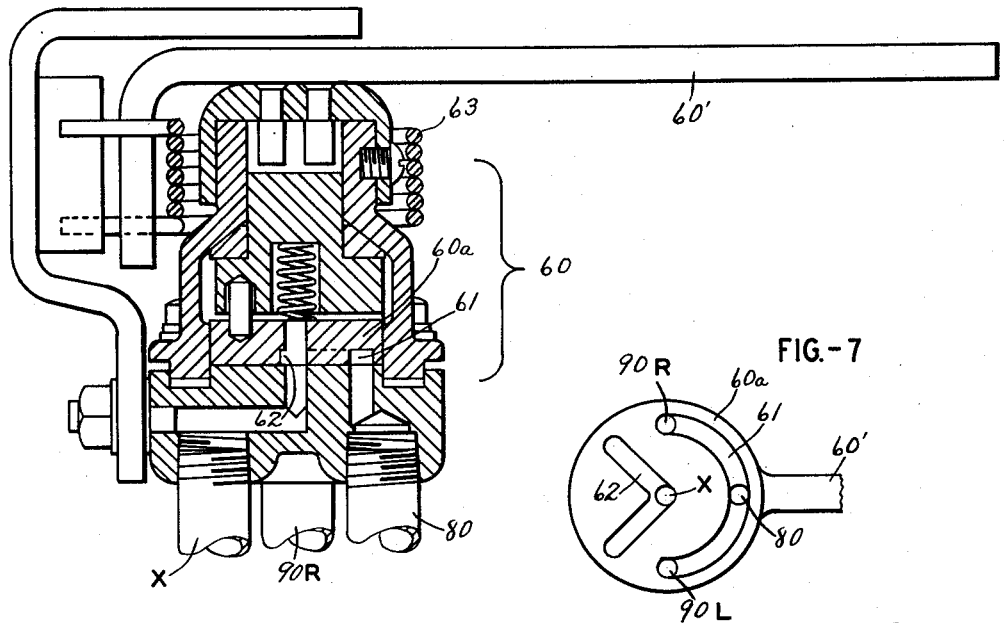
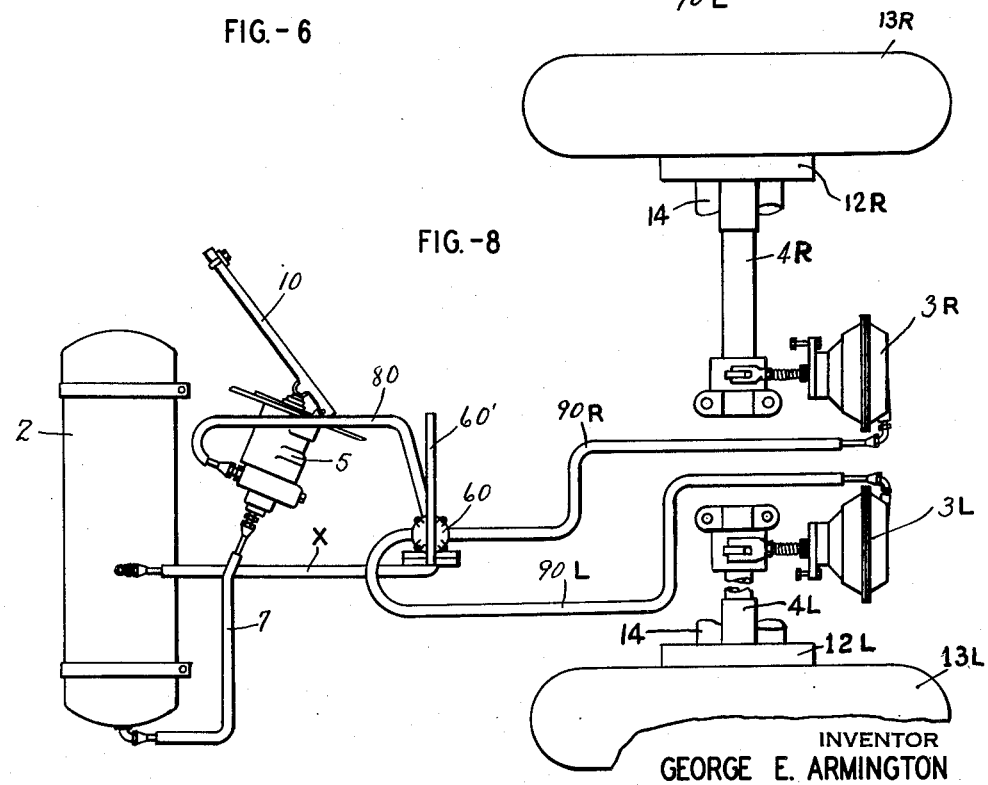

Patented Feb. 25, 1941

2,233,192

UNITED STATES PATENT OFFICE 2,233,192

TRACTOR BRAKING CONTROL

George E. Armington, South Euclid, Ohio, assignor to The Euclid Road Machinery Company, Euclid, Ohio, a corporation of Ohio Application November 13, 1937, Serial No. 174,308

2 Claims. (Cl. 303—6)

This invention relates to brake means for slow moving self-propelling vehicles such as large heavy-duty tractors employed for hauling dump trailers in earth-moving operations. More particularly the type of tractor vehicle contemplated is steered by gear controlled by an operator-operated steering member, usually the familiar steering wheel, by which one or a pair of load-supporting wheels, usually located at the front end of the tractor vehicle, are adjusted for directing the vehicle on its path. The vehicle type contemplated is propelled by a pair or more of wheels at its opposite sides, driven from an engine carried by the vehicle, through a speed-changing device and differential gearing which permits relative motion between the driving wheels as when the vehicle is turning.

Such a vehicle in such service occasionally has very sharp turns to make while encumbered by a large carried or drawn load and while entirely or partially supported upon very soft ground, and because of these conditions the art has adopted separate brakes for the tractor driving wheels. Thus by simultaneous application of both brakes the tractor with its load may be brought to a stop as in usual braking operations. By operation of one brake alone, steering of the vehicle may be improved, the brake to be applied in steering being that on the inside of the turn for which the steering gear is set. Also and not least important, when one driving wheel has no traction, as when mired, application of its brake to that wheel will cause positive operation of the other wheel, through the differential, when otherwise the differential would permit futile spinning of the mired wheel.

Objects of this invention are generally to provide improved control of such a pair of brakes for their optional selective or simultaneous application, it being understood that the brakes on the described class of vehicles are ordinarily power-actuated.

Another object of the invention is to provide generally a manual controller for selective brake operation and a pedal controller for simultaneous operation, preferably of the same brakes, and an important object is to so relate the manual controller with the steering member that the operator may have selective steering brake control by the same general motions with which he manipulates the steering member.

Figure 1:
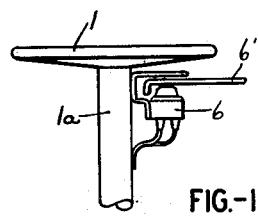
Figure 2:
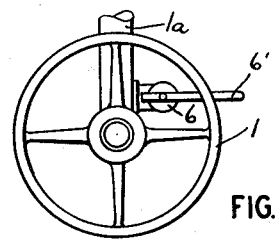
Figure 3:
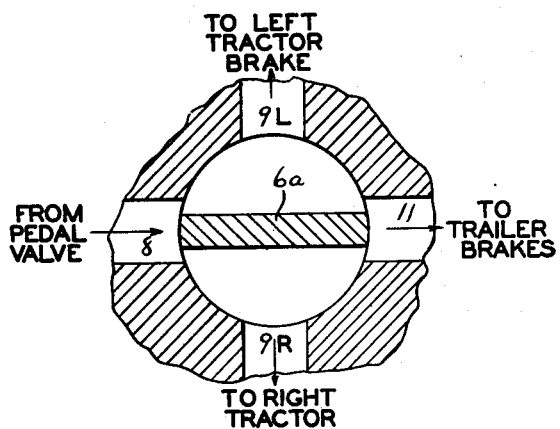
Figure 4:
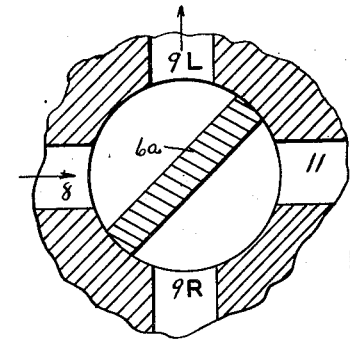
Figure 5:
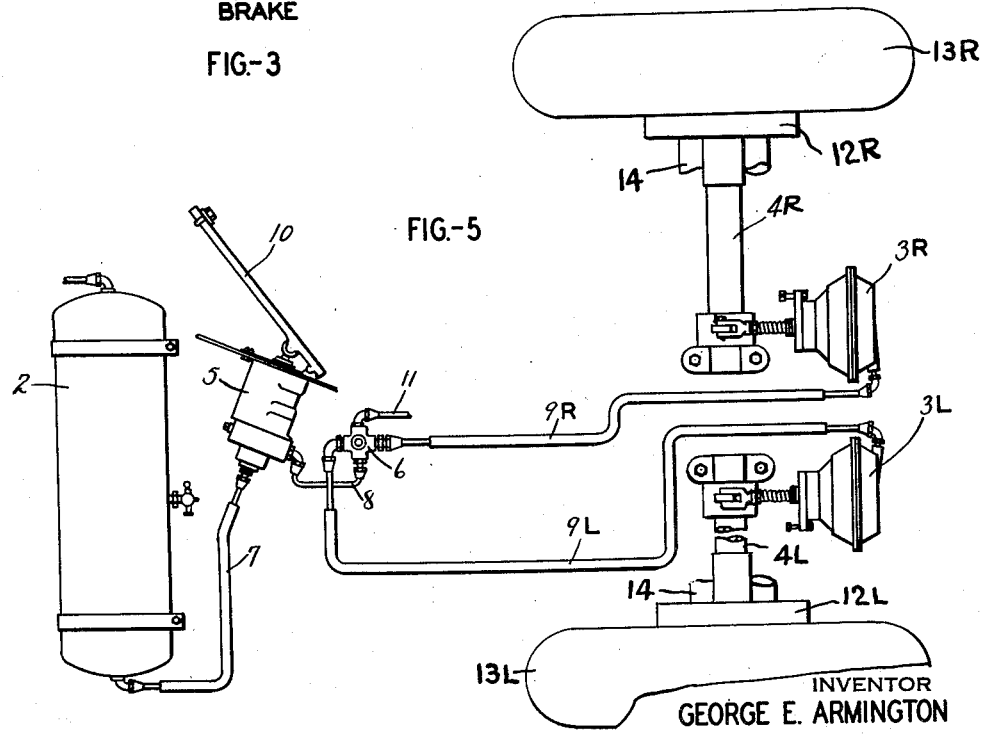

The exact nature of the invention together with further objects and advantages thereof will be apparent from the following description taken in connection with the accompanying drawings, in which Figs. 1 and 2 are generally elevation and plan views respectively of a steering member of a tractor vehicle illustrating the manual brake controller associated therewith; Figs. 3 and 4 are conventionalized showings as in typical section, of the manual controller valve indicating the latter as set respectively for equal brake application and for application of one brake alone; Fig. 5 is a simplified diagrammatic showing of essential parts of the complete brake actuating and controlling circuit; Figs. 6, 7 and 8 show a modified arrangement, Fig. 6 being a typical longitudinal section of the manual controller, Fig. 7 being a conventionalized view showing the face of the valve of Fig. 6, and its relation with its ports in the valve body, and Fig. 8 being a view corresponding to Fig. 5 but illustrating the modification.

With reference now to the drawings and first to the form of Figs. 1 to 5, 1 is the usual steering member of the tractor vehicle, which vehicle usually has a pair of differentially driven wheels and a brake for each wheel as described above. As illustrative only, wheels 13L and 13R are shown carried by an axle and housing 14. The wheels are provided with brake drums 12L and 12R respectively and the brake-applying cams are operated by the rock shafts shown at 4L and 4R.

The system contemplated provides power application of the brakes and that illustrated employs pneumatic power and therefore as shown in Fig. 5, a source of power here indicated as by a receiver 2 is provided, and a pair of actuators 3L and 3R are provided one for the brake of each wheel. Details of these actuators are immaterial, the type indicated being of standard diaphragm form, each actuating its brake as through linkage including the rock shafts 4L and 4R, one for each brake.

According to this invention the circuit by which the actuators 3L and 3R have power from the receiver 2, includes two valves 5 and 6 arranged in series relation, the valve 5 having connection from the receiver by a line 7, being connected to the valve 6 by line 8 and the valve 6 having connection with both actuators by lines 9L and 9R respectively.

The valve 5 is of throttle type arranged to be actuated by a pedal 10 located for convenient depression by the operator of the vehicle. Construction details of this valve are unimportant, it being sufficient to here understand that the valve is of throttling type yieldably urged to closed position and openable from such position by depression of the pedal 10 and arranged to pass the more air the greater the depression of the pedal.

The valve 6 is essentially a three-way valve as indicated in Figs. 3 and 4, having a valve proper 6a which directs inflow by way of the line 8 from the valve 5 either to both actuators 3L and 3R by way of their lines 9L and 9R or to one actuator only as indicated in Fig. 4 where the valve is set to pass air to the line 9L only.

That a trailer may be hitched to the tractor vehicle and its brakes applied coincidentally with those of the tractor for deceleration, the valve 6 may have connection as indicated at 11, with the trailer brake actuator, it being understood that this connection is closed unless such trailer be so employed.

The valve proper 6a is yieldably urged to its neutral position of Fig. 3 as by suitable spring means such as those shown in Fig. 6 and to be described, and is provided with a manual 6' by which it may be moved in one direction as in Fig. 4 to cut off the line 9R, or in the opposite direction to similarly cut off the line 9L. The valve is disposed as in Figs. 1 and 2 as by mounting on the column 1a of the steering wheel member 1, that its manual 6' extends adjacent the periphery of the steering wheel, so that the operator in turning the wheel may at the same time shift the manual in the same general direction in which the steering wheel is being moved. Further, the arrangement is such that shifting the manual 6' counterclockwise, Fig. 2, when the steering wheel 1 is turned counterclockwise as to cause a left turn of the vehicle, the valve will be set as in Fig. 4 to cut off power from the right-hand actuator 3R; and vice versa.

Operation will be as follows. Supposing the valve 6 to be in its usual neutral position, depression of the brake pedal 10 will cause coincidental energization of both actuators 3L and 3R to apply both brakes equally, the power flow being by way of the receiver 2, line 7, valve 5, line 8, valve 6 as indicated by the arrows in Fig. 3, both lines 9L and 9R to their actuators 3L and 3R. Also, flow will be had to the trailer brakes if the connection 11 be provided.

Should the operator wish to make a left turn, he moves the steering wheel 1 counterclockwise, Fig. 2. If the turn is to be a sharp one or for any reason the vehicle does not satisfactorily respond to the steering gear, the operator may drop the fingers of his right hand to engage the manual 6' shifting its valve to the left, from the position of Fig. 3 to that of Fig. 4, and thus setting the circuit to apply the left-hand brake. Thereupon depression of the pedal 10 will energize the left-hand brake and assist the left turn. Obviously similarly a right turn may be negotiated by operation of the manual 6' in the opposite direction.

Should the right-hand driving wheel be mired where the left-hand wheel has good traction, the operator may shift the manual 6' clockwise, Fig. 2, and depress the pedal 10 to brake the right-hand wheel so that the left-hand driving wheel will be energized through the differential between the wheels, and the vehicle thus propelled until both driving wheels have traction whereupon the brake may be released.

This latter operation requires some skill of the operator. The tractor having the usual accelerator pedal for control of its engine throttle and also the usual clutch pedal for control of power flow from its engine to its driving axle, it is inconvenient for the operator to depress the pedal 10 under such conditions.

The modification illustrated in Figs. 6, 7 and 8 is superior in this respect as will appear. In this modification the same receiver 2, actuators 3R and 3L, throttle valve 5 operated by pedal 10 and having connection 7 with the receiver, are provided and arranged as before. But a valve 60 operable by manual 60', is substituted for the valve 6 of the modification heretofore described.

This valve 60 is connected to the valve 5 by line 80 and has separate connections with the actuators 3R and 3L by lines 90R and 90L. The valve also has a connection X directly from the receiver 2 and independent of its connection 80 from the valve 5.

As indicated in Figs. 6 and 7, the valve is generally of standard disk type having a valve proper 60a, the face of which is provided with an arcuate passage 61 and a V-shaped passage 62. The valve body is suitably ported so that the passage 62 has communication at all times with the line X from the receiver, the bend of the passage 62 being located at the valve axis for the purpose. Ports for the lines 80, 90L and 90R are provided in the valve body at the radius of the valve passage 61 which is concentric of the valve axis, and the two arms of the passage 62 extend radially to the radius of the passage 61.

Thus when the valve is set in the position of Figs. 6 and 7, which is its neutral position, no flow may be had through the line X because the branches of the V-passage 62 have no outlet. But communication is established by way of the arcuate passage 61 from the line 80 to both lines 90L and 90R, so that if the pedal valve 5 be opened both brake actuators will be energized. The valve with its manual 60' is yieldably urged to this neutral position by a torsion spring 63 which permits valve movement in either direction about the valve axis. Clockwise or right-hand movement of the valve Fig. 7, will cut off communication of the line 90R without disturbing communication of the line 90L, with the line 80. At the same time such adjustment will establish communication from the line X to the line 90R by way of the V-passage 62, so that the right-hand brake actuator 3R will be energized. Similarly adjustment of the valve in the opposite or left-hand direction, will cause energization of the left-hand actuator 3L to apply the left brake.

The valve 60 is mounted in the same general manner as indicated in Figs. 1 and 2 and for the same purposes, in such arrangement that adjustment of its manual 60' in the direction of steering wheel adjustment, will apply the brake on the wheel at the inside of the turn desired, it being understood that manipulation of the manual 60' is optional with the operator as before.

General operation of the modification of Figs. 6, 7 and 8 is thus as in the earlier described modification, the principal difference being that the operator may apply either brake individually by manipulation of the manual 60' alone and without depression of the pedal 10. Obviously when the valve 60 is in its usual neutral position, depression of the pedal 10 will cause application of both brakes equally as before.

The general circuit differences in the two modifications may be characterized in the relation between the pedal and manual valves. In the modification of Fig. 5 these valves are in series relation whereas in the modification of Fig. 8 these valves are in parallel relation.

What I claim is:

1. In a vehicle having a wheel on each side and a brake for each wheel, means for operating said brakes and including a source of power, a separate actuator for each brake, and a circuit for connecting said power to said actuators, said circuit including a controller arranged to selectively admit power to either of said actuators and having a neutral position wherein it interconnects said actuators but does not supply power to either, and a second controller arranged to admit power to both said actuators when said first named controller is in said neutral position, there being a power supply through said first named controller in its selective positions independent of the power supply through said second controller.

2. In a vehicle having a wheel on each side and a brake for each wheel and having oscillatable means for steering the vehicle, means for operating said brakes including a source of supply of pressure fluid, a fluid operated actuator for each brake, a conduit system for conducting fluid from said source to said actuators including a foot operated valve and a selector valve in series, said selector valve having a neutral position in which fluid is supplied to both actuators, said selector valve being oscillatable to either side of neutral position to direct fluid selectively to one or the other of said actuators, and said selector valve having a controller located adjacent said oscillatable steering means and adapted to be operated coincidentally therewith at the will of the operator to move in the same direction as said steering means to cause operation of the actuator for setting the brake on that side of the vehicle toward which it is desired to turn.

GEORGE E. ARMINGTON.